(12) United States Patent
Miller et al.

(10) Patent No.: US 11,709,279 B2
(45) Date of Patent: Jul. 25, 2023

(54) DEVICE ORIENTATION INITIALIZATION (71) Applicant: Apple Inc., Cupertino, CA (US)

(72) Inventors: Isaac T. Miller, Half Moon Bay, CA (US); Mark G. Petovello, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 623 days.

(21) Appl. No.: 16/712,890

(22) Filed: Dec. 12, 2019

(65) Prior Publication Data

US 2021/0048541 A1 Feb. 18, 2021

Related U.S. Application Data (60) Provisional application No. 62/886,900, filed on Aug. 14, 2019.

(51) Int. Cl.
G01S 19/39 (2010.01)
G01S 19/43 (2010.01)
G01S 19/49 (2010.01)

(52) U.S. Cl.
CPC ............ *G01S 19/393* (2019.08); *G01S 19/43* (2013.01); *G01S 19/49* (2013.01)

(58) Field of Classification Search
CPC ........ G01S 19/393; G01S 19/47; G01S 19/49; G01C 21/16–188
See application file for complete search history.

(56) References Cited

U.S. PATENT DOCUMENTS

| 8,972,180 B1* | 3/2015 | Zhao | G01C 21/165 |
| | | | 701/468 |
| 11,035,673 B2* | 6/2021 | Faragher | G01C 21/16 |
| 2004/0172173 A1* | 9/2004 | Goto | G01C 21/26 |
| | | | 701/1 |

* cited by examiner

Primary Examiner — Cassi J Galt
(74) Attorney, Agent, or Firm — BakerHostetler (57) ABSTRACT A device implementing a system for device orientation initialization includes at least one processor configured to determine that the device is within or coupled to a vehicle in motion. The at least one processor is configured to employ, in response to the determining, a first position estimation model to estimate a position of the device, and detect occurrence of a predefined condition with respect to employing the first position estimation model. The at least one processor is further configured to switch, in response to detecting occurrence of the predefined condition, from employing the first position estimation model to employing a second position estimation model to estimate the position of the device. The first and second position estimation model apply different respective error state metrics in estimating the position of the device.

20 Claims, 6 Drawing Sheets

DEVICE ORIENTATION INITIALIZATION

CROSS REFERENCE TO RELATED APPLICATIONS

This application claims the benefit of priority to U.S. Provisional Patent Application No. 62/886,900, entitled "Device Orientation Initialization," and filed on Aug. 14, 2019, the disclosure of which is hereby incorporated herein in its entirety.

TECHNICAL FIELD

The present description relates generally to estimating the position and/or orientation of a device, including initializing device orientation and/or attitude.

BACKGROUND

An electronic device such as a laptop, tablet, smart phone or a wearable device may include a Global Navigation Satellite System (GNSS) receiver and one or more sensors (e.g., an accelerometer, a gyroscope, etc.) that may be used in conjunction with each other to estimate the position and/or orientation of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

An electronic device may include a GNSS receiver and an inertial measurement unit (IMU) (e.g., including one or more sensors such as an accelerometer and/or a rate gyroscope) that may be used alone or in conjunction with each other to estimate the position and/or orientation of the electronic device. The device attitude (or orientation) may include one or more parameters, including heading (e.g., angle relative to magnetic north), pitch (e.g., motion about the lateral axis) and roll (e.g., motion about the longitudinal axis).

With respect to heading, the electronic device may further include a magnetometer configured to indicate device heading. However, the magnetometer may be prone to noise errors, such that its estimated heading is inaccurate. Accelerometer measurements (e.g., by a device accelerometer) may also be used to determine device heading, for example, based on performing principal component analysis on the accelerometer data. However, determining device heading based on principal component analysis may sometimes result in heading ambiguity. For example, the estimated heading may be ambiguous with respect to whether the estimate is in the forward direction or the backward direction (e.g., the estimated device heading may off by 180°).

The electronic device may implement a Kalman filter, which uses information provided by the GNSS receiver and/or the IMU to estimate device position. In doing so, the Kalman filter may be provided with an initial set of device orientation parameters. In a case where the device is within or coupled to a moving vehicle, an inaccurate set of orientation parameters may result in delay with respect to GNSS receiver estimates converging with IMU estimates, potentially resulting in prolonged errors in device position estimation by the Kalman filter.

The subject system provides for initially using a first position estimation model, in conjunction with the Kalman filter, to estimate device position. The first position estimation model may correspond to a low accuracy and high acceleration model (e.g., generally used to track pedestrian motion). After the occurrence of a predefined condition (e.g., passage of a preset period of time, and/or convergence of GNSS receiver estimates and IMU estimates), the device switches to using a second position estimation model (e.g., corresponding to higher accuracy and lower acceleration, generally used to track motion of a vehicle), in conjunction with the Kalman filter, to estimate device position. The first and second position estimation models may apply different respective error state metrics (e.g., associated with the IMU). As noted, the first position estimation model may correspond with lower accuracy and higher acceleration relative to the second position estimation model. By virtue of using the first and second position estimation models in this manner (e.g., as the first position estimation model may be less prone to inverting device heading), it is possible to decrease heading ambiguity with respect to determining initial device orientation (attitude) parameters for estimating device position.

The subject system may further provide for initializing a direction of travel for the device, where the direction of travel is used to initialize the device orientation parameters for the above-mentioned first position estimation model. In some cases where the device is mounted or otherwise coupled to a moving vehicle, acceleration attributed to centrifugal motion may result in inaccurate estimates for the direction of travel, and use of these inaccurate estimates by the Kalman filter may result in inaccurate estimates for device position.

The electronic device may determine that acceleration measurements (e.g., provided by a device accelerometer) meet a predefined condition, or threshold value(s), associated with centrifugal motion. If the predefined condition is met, the device may calculate a direction of travel for the device based on a kinematics acceleration model which implements motion-based constraints (e.g., non-holonomic constraints that constrain vehicle motion in the vertical and/or sideways directions) with respect to the direction of travel. The calculated direction of travel may be used to estimate device orientation, which may be used as an initial (and/or subsequent) set of parameters for the above-noted first position estimation model.

Thus, it is possible for the subject system to determine initial sets of parameters for device orientation (e.g., with reduced ambiguity with respect to heading and/or direction of travel). The device orientation may be used as initial value(s) for a Kalman filter to estimate device position.

Figure 1:
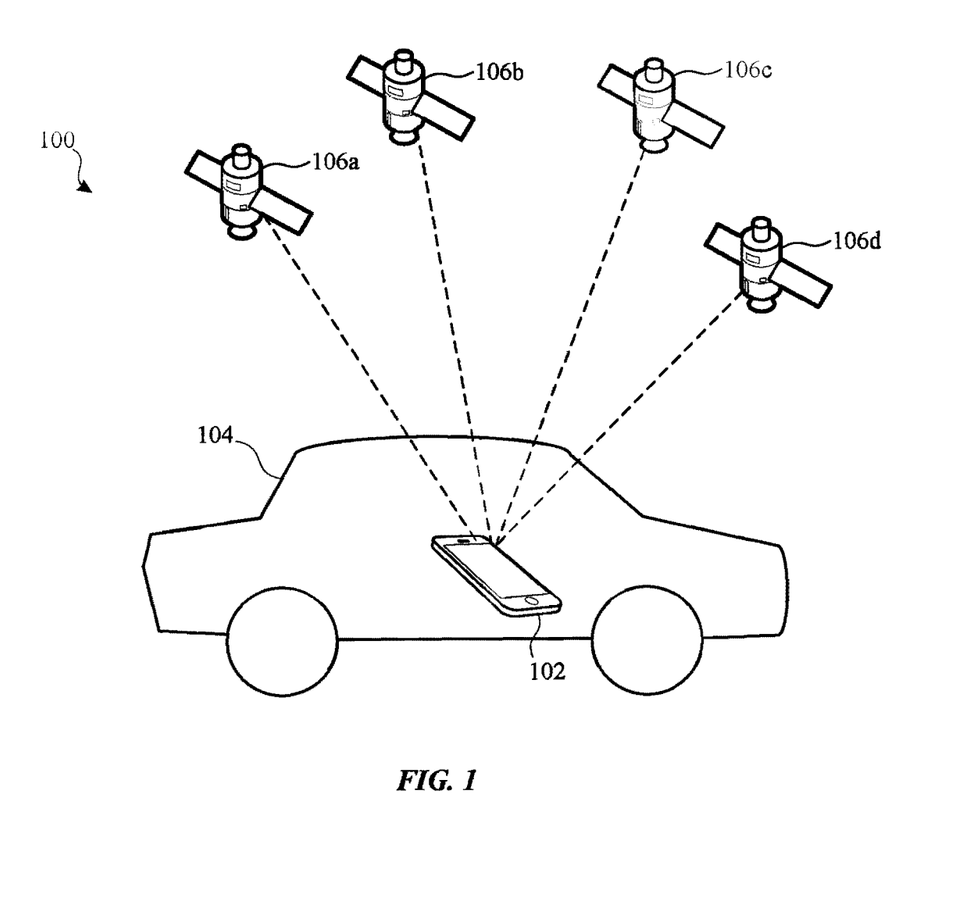
FIG. 1 illustrates an example positioning system in which an electronic device may implement the subject system for device orientation initialization in accordance with one or more implementations.

FIG. 1 illustrates an example positioning system 100 in which an electronic device 102 may implement the subject system for device orientation initialization in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The positioning system 100 includes the electronic device 102 and GNSS satellites 106a, 106b, 106c and 106d, hereinafter "106a-106d". For explanatory purposes, the positioning system 100 is illustrated in FIG. 1 as including the electronic device 102 and the four GNSS satellites 106a-106d; however, the positioning system 100 may include any number of electronic devices and any number of GNSS satellites. Other positioning technologies may be used independent of or in conjunction with GNSS technology to determine device position. Examples of such positioning technologies include, but are not limited to, Wi-Fi positioning, cellular phone signal positioning, Bluetooth signal positioning and/or image recognition positioning.

The positioning system 100 may be used for estimating the position of the electronic device 102. In one or more implementations, the electronic device 102 is contained within and/or mounted or otherwise coupled to a vehicle 104 in motion, and the position of the electronic device 102 is continuously updated while the vehicle 104 is in motion (e.g., for the duration of a trip). The vehicle 104 may be a land vehicle such as an automobile, a motorcycle, a bus, a train, a bicycle or a skateboard, or may be a watercraft, an aircraft or any other appropriate vehicle for travel. In FIG. 1, by way of example, the vehicle 104 is depicted as an automobile.

The positioning system 100 allows the electronic device 102 to determine its position based at least in part on signals received from GNSS satellites 106a-106d. For example, the positioning system 100 allows the electronic device 102 to determine its position (e.g., longitude, latitude, and altitude/elevation) using signals transmitted along a line of sight by radio from GNSS satellites 106a-106d. For example, the GNSS satellites 104a-104d may be compatible with one or more of the Global Positioning System (GPS), the Global-naya Navigazionnaya Sputnikovaya Sistema (GLONASS), the Galileo positioning system, and/or generally any positioning system.

Other positioning technologies (not shown) may be used independent of or in conjunction with GNSS (e.g., the GNSS satellites 104a-104d) to determine device position. For example, the location of the electronic device 102 may be determined based on time of arrival, angle of arrival, and/or signal strength of signals received from wireless access points which may have known locations (e.g., within a building or store, mounted on street posts, etc.). Alternatively or in addition, positioning technologies such as, but not limited to, cellular phone signal positioning, (e.g., positioning using cellular network and mobile device signals), indoor positioning systems, Bluetooth signal positioning and/or image recognition positioning may be used to determine device position.

Moreover, the electronic device 102 may implement an inertial navigation system (INS). The INS may use device sensor(s) (e.g., motion sensors such as accelerometers and/or rate gyroscopes) to calculate device state (e.g., device position, velocity, orientation) for supplementing position data provided by the above-mentioned positioning technologies in order to estimate device position.

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic device discussed below with respect to FIG. 2, and/or the electronic system discussed below with respect to FIG. 6.

Figure 2:
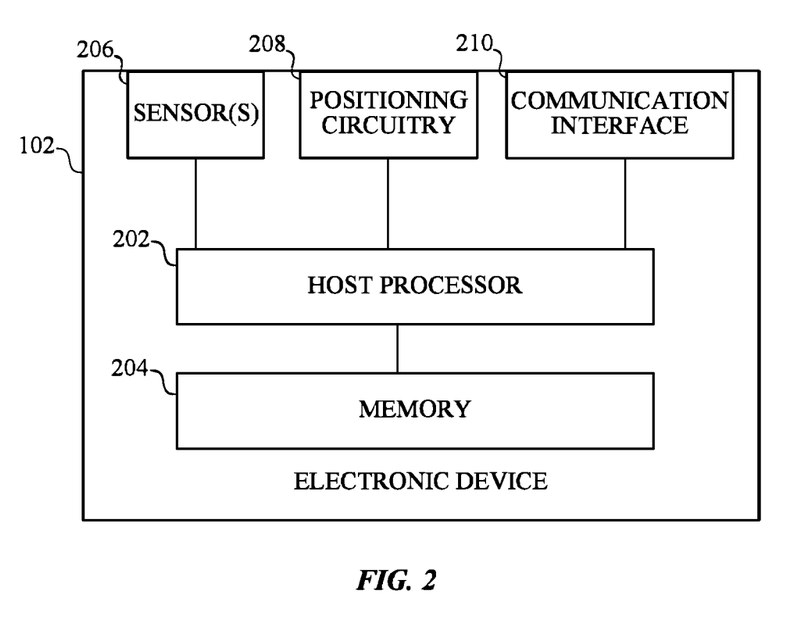
FIG. 2 illustrates an example electronic device that may implement the subject system for device orientation initialization in accordance with one or more implementations.

FIG. 2 illustrates an example electronic device that may implement the subject system for device orientation initialization in accordance with one or more implementations. For explanatory purposes, FIG. 2 is primarily described herein with reference to the electronic device 102 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, one or more sensor(s) 206, positioning circuitry 208 and a communication interface 210. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store values for sensor signal measurements, GNSS receiver data, device position estimates and/or device orientation (attitude) estimates, for example, based on motion of the electronic device 102. The memory 204 may also store component(s) and/or module(s) configured to estimate device position, for example, as discussed with respect to FIG. 3 as discussed below.

The sensor(s) 206 may include one or more motion sensor(s), such as an accelerometer and/or a gyroscope (e.g., a rate gyroscope). The motion sensor(s) may be used to facilitate movement and orientation related functions of the electronic device 102, for example, to detect movement, direction, and orientation of the electronic device 102.

Alternatively or in addition, the sensor(s) 206 may include one or more of a barometer, an electronic magnetometer, an image sensor, or generally any sensor that may be used to facilitate a positioning system. The barometer may be utilized to detect atmospheric pressure, for use in determining altitude change of the electronic device 102. The electronic magnetometer (e.g., an integrated circuit chip) may provide data used to determine device heading (e.g., the direction of magnetic north), for example to be used as part of a digital compass. The image sensor (e.g., a camera) may be used to capture images (e.g., photographs, video) to derive position and/or sequences of images to derive device motion. Captured single images and/or sequences of images may also be used to derive orientation of the image sensor (e.g., and/or electronic device 102).

The positioning circuitry 208 may be used in determining the position of the electronic device 102 based on positioning technology. For example, the positioning circuitry 208 may provide for one or more of GNSS positioning (e.g., via a GNSS receiver configured to receive signals from the GNSS satellites 104a-104d), wireless access point positioning (e.g., via a wireless network receiver configured to receive signals from wireless access points), cellular phone signal positioning, Bluetooth signal positioning (e.g., via a Bluetooth receiver), image recognition positioning (e.g., via an image sensor) and/or an INS (e.g., via motion sensors such as an accelerometer and/or gyroscope).

The communication interface 210 may include suitable logic, circuitry, and/or code that enables wired or wireless communication, such as between the electronic device 102 and other device(s). The communication interface 210 may include, for example, one or more of a Bluetooth communication interface, an NFC interface, a Zigbee communication interface, a WLAN communication interface, a USB communication interface, or generally any communication interface.

In one or more implementations, one or more of the host processor 202, the memory 204, the sensor(s) 206, the positioning circuitry 208, the communication interface 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
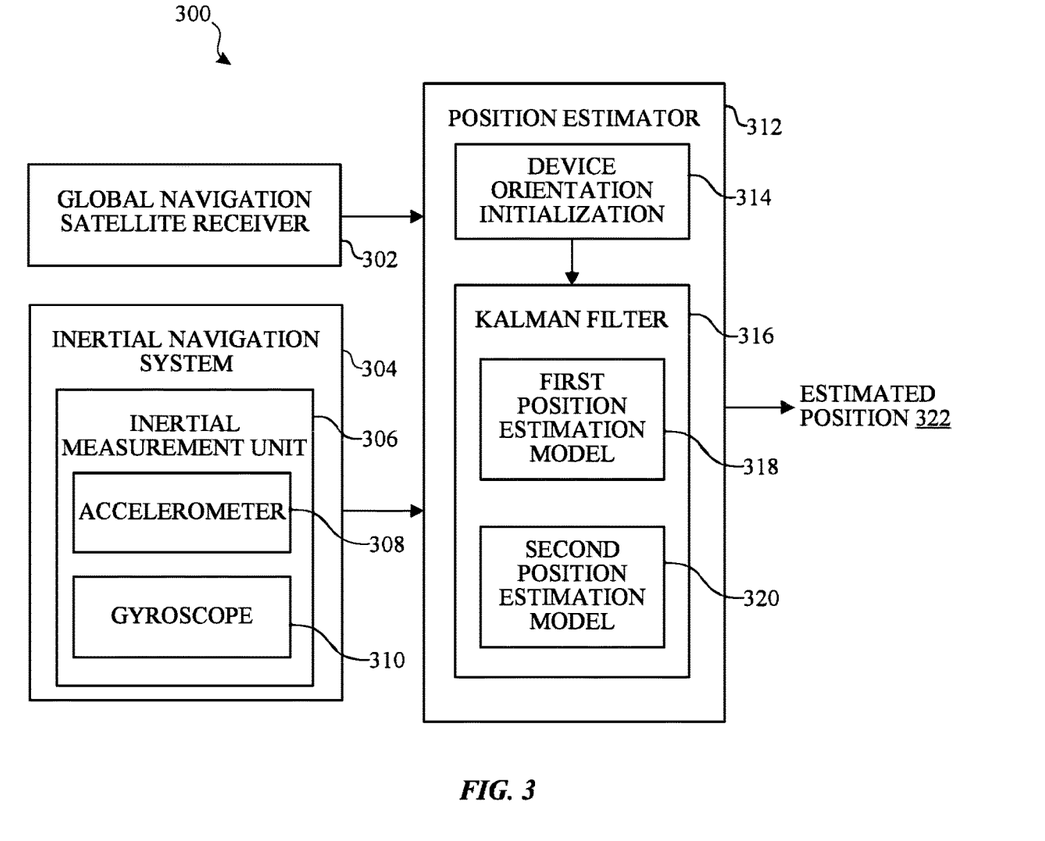
FIG. 3 illustrates an example architecture, that may be implemented by an electronic device, for device orientation initialization in accordance with one or more implementations.

FIG. 3 illustrates an example architecture 300, that may be implemented by an electronic device, for device orientation initialization in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the architecture 300 may provide for determining estimates of device orientation (e.g., heading and/or direction of travel). The estimates of device orientation may be used as initial values to a Kalman filter (e.g., the Kalman filter 316) to estimate device position.

The architecture 300 may include a GNSS receiver 302. For example, the GNSS receiver 302 may provide for GNSS positioning (e.g., corresponding to the positioning circuitry 208 in FIG. 2). The architecture 300 may further include an inertial navigation system (INS) 304, which may include an inertial measurement unit (IMU) 306 with an accelerometer 308 and/or a gyroscope 310 (e.g., a rate gyroscope). For example, one or more of the accelerometer 308 and/or the gyroscope 310 may correspond to the sensor(s) 206 in FIG. 2.

The architecture 300 may further include a position estimator 312 configured to output an estimated position 322 for the electronic device 102. The position estimator 312 may include a device orientation initialization module 314 and the Kalman filter 316, which includes a first position estimation model 318 and a second position estimation model 320. For explanatory purposes, FIG. 3 illustrates a single GNSS receiver 302, a single accelerometer 308 and a single gyroscope 310; however, any number of GNSS receivers, accelerometers, gyroscopes, magnetometers, and/or other sensors may be used.

In one or more implementations, the IMU 306 may be configured to measure linear and angular motion of the electronic device 102, for example, based on measurements received from the accelerometer 308 and/or the gyroscope 310. The IMU 306 may be part of the INS 304, which uses the measured linear and angular motion from the IMU 306 to estimate device state (e.g., position, velocity, attitude).

The position estimator 312 (e.g., including the Kalman filter 316) may receive output from the GNSS receiver 302 (e.g., corresponding to estimated device position(s)), as well as output from the INS 304 (e.g., corresponding to estimated device state(s)) as input. The position estimator 312 may be configured to provide the estimated position 322 of the electronic device 102 as output. In one or more implementations, the Kalman filter 316 may correspond to an algorithm that uses a series of measurements/signals (e.g., which may contain noise and other inaccuracies) observed over time, and that produces estimates of unknown variables (e.g., device state and/or position) which tend to be more accurate than those based on a single measurement alone (e.g., single GNSS measurements). Thus, the Kalman filter 316 may be configured to use the respective estimates as provided by the GNSS receiver 302 and the INS 304 in determining the estimated position 322.

As noted above, device orientation (or attitude) may include one or more parameters, including heading (e.g., angle relative to magnetic north), pitch (e.g., motion about the lateral axis) and roll (e.g., motion about the longitudinal axis). A magnetometer (e.g., one of the sensor(s) 206) of the electronic device 102 may be configured to estimate device heading, but may be prone to noise errors. Further, accelerometer measurements (e.g., provided by the accelerometer 308 and/or IMU 306) may also be used to estimate device heading based on performing principal component analysis on the accelerometer data. However, the estimated device heading may be ambiguous with respect to whether the estimate is in the forward direction or the backward direction (e.g., the estimated device heading may off by 180°). In a case where the electronic device 102 is within or coupled to a moving vehicle (e.g., the vehicle 104), an inaccurate set of orientation parameters (e.g., including a device heading error of 180°) may result in delay with respect to GNSS receiver estimates converging with IMU/INS estimates, thereby likely resulting in prolonged errors in device position estimation provided by the Kalman filter 316.

In one or more implementations, the electronic device 102 may be configured to detect if the device is within and/or mounted or otherwise coupled to a vehicle in motion (e.g., the vehicle 104). In doing so, the electronic device 102 may use one or more signals to detect travel within a vehicle, including but not limited to: a signal from an application (e.g., a map-based application and/or travel application) indicating vehicle motion (e.g., via automobile, train, bus); and/or a signal from a motion classifier (e.g., which may be implemented by an always-on processor of the electronic device 102) indicating vehicle motion.

After detecting that the electronic device 102 is within and/or mounted or coupled to a vehicle in motion, the Kalman filter 316 may begin with using the first position estimation model 318 to estimate device position. Further, after the occurrence of a predefined condition (discussed below), the Kalman filter 316 may switch to using the second position estimation model 320 to estimate device position. In general, the first position estimation model 318 may correspond to a low accuracy and higher acceleration model (e.g., which may be used to track pedestrian motion), while the second position estimation model 320 may correspond to a high accuracy and low acceleration model (e.g., which may be used to track vehicle motion). For example, the first position estimation model 318 may be less prone to providing an inverted heading (e.g., an estimated device heading off by 180°).

In one or more implementations, the first position estimation model 318 may use error state metrics (e.g., associated with the IMU 306 and/or INS 304) that are different than those used by the second position estimation model 320. The first position estimation model 318 may set gyroscope bias (e.g., on a per axis basis, for 3 axes), accelerometer scale factors (e.g., on a per axis basis) and/or accelerometer bias (e.g., on a per axis basis) as provided by the IMU 306 to correspond with low accuracy and high acceleration (e.g., relative to the second position estimation model 320). As noted above, the first position estimation model 318 may generally be used to track pedestrian motion, where high acceleration events (e.g., motion from walking, jogging and the like) are more likely to occur relative to motion of a device mounted in a vehicle.

Moreover, the second position estimation model 320 may set gyroscope bias (e.g., on a per axis basis, for 3 axes), accelerometer scale factors (e.g., on a per axis basis) and/or accelerometer bias (e.g., on a per axis basis) as provided by the IMU 306 to correspond with high accuracy and low acceleration (e.g., relative to the first position estimation model 318). As noted above, the second position estimation model 320 may generally be used to track vehicle motion, where high acceleration events are less likely to occur relative to pedestrian motion.

As noted above, the Kalman filter 316 may switch from using the first position estimation model 318 to using the second position estimation model 320 in response to detecting a predefined condition. In one or more implementations, the predefined condition may correspond to use of the first position estimation model 318 for a predetermined period of time (e.g., 30 seconds, 60 seconds, 100 seconds, 150 seconds, etc.). For example, the predetermined period of time may correspond to a time (e.g., based on empirical data) after which GNSS receiver estimates would generally converge with IMU estimates. In this manner, the electronic device 102 would not necessarily be required to perform the additional processing to detect such convergence. Alternatively or in addition, the predefined condition may correspond to the electronic device 102 determining that the GNSS receiver estimates have converged with the IMU estimates (e.g., based on predefined heuristics indicating sufficient convergence).

By virtue of initially using the first position estimation model 318, and switching to using the second position estimation model 320, it is possible to decrease ambiguity in heading estimates. With reduced ambiguity for heading, initial device orientation parameters may be more reliable when estimating device position (e.g., via the Kalman filter 316).

In one or more implementations, after the Kalman filter has already switched from using the first position estimation model 318 to using the second position estimation model 320 based on detecting the predefined condition, the electronic device 102 may be configured to switch back to using the first position estimation model 318. The electronic device 102 may be configured to detect the occurrence of a second predefined condition, and perform such switching back in response to detecting the second predefined condition. For example, the second predefined condition may correspond to the electronic device 102 being removed or dismounted and/or otherwise adjusted/moved (e.g., based on a threshold amount of movement) with respect to its fixed position within the vehicle 104.

Similar to the initialization process, using the first position estimation model 318 in this scenario (e.g., dismount and/or adjustment from fixed position) may provide for reducing ambiguity for estimated heading (e.g., reducing heading estimates related to 180° errors). Moreover, the Kalman filter 318 may use the first position estimation model 318 until the (first) predefined condition occurs again (e.g., passage of the predetermined period of time and/or detecting convergence of convergence of the GNSS receiver estimates and IMU estimates), and again switch to using the second position estimation model 320.

As noted above, acceleration attributed to centrifugal motion may result in inaccurate estimates for the direction of travel. For example, backing out of a driveway while turning may produce accelerometer measurements which cause the direction of travel to be inaccurate to the order of 90°. Moreover, the direction of travel corresponds to device heading, which may be a component of device orientation. As such, the estimated initial device orientation values provided by the INS 304 to the Kalman filter 316 may be inaccurate, resulting in degraded device position estimates.

In one or more implementations, the device orientation initialization module 314 may be configured to reduce error(s) associated with acceleration attributed to centrifugal (and/or centripetal) motion. Although illustrated in the example of FIG. 3 as being separate and outside of the Kalman filter 316, the device orientation initialization module 314 may instead by included within the Kalman filter 316 in one or more implementations or may correspond to a module outside of the position estimator 312. The device orientation initialization module 314 may be configured to set a direction of travel (e.g., corresponding to device heading) based on acceleration measurements provided by the accelerometer 308 (e.g., measurements captured over a rolling, predefined time period such as 3.5 seconds). The initial direction of travel may be used to determine the device orientation parameters for initializing the first position estimation model 318.

In particular, the device orientation initialization module 314 may determine that the acceleration measurements (e.g., provided by the accelerometer 308) meet a predefined condition (and/or threshold value(s)) associated with centrifugal motion (e.g., based on empirical data associated with backing out of a driveway, taking sharp turns, and the like). If the predefined threshold is met, the device orientation initialization module 314 may set the direction of travel based on a kinematics acceleration model (discussed below) which implements motion-based constraints with respect to the direction of travel. Otherwise, the device orientation initialization module 314 may set the direction of travel based on a primary direction of acceleration (e.g., as provided by the accelerometer 308) for the electronic device 102. The direction of travel as set by the device orientation initialization module 314 may be used to estimate device orientation (or attitude), which may be used as an initial set of parameters for the first position estimation model 318.

As noted, the kinematics acceleration model may implement motion-based constraints. For example, the motion-based constraints may correspond to one or more non-holonomic constraints which constrain motion in the vertical and/or in the sideways directions (e.g., as these directions are limited for the vehicle 104, which typically travels in the forward or backward direction). In one or more implementations, acceleration for a motion of the vehicle (e.g., the vehicle 104) may generally be calculated as follows:

$$\text{acceleration} = a*es + \frac{s^2}{r}*en \quad \text{(Equation 1)}$$
$$= a*es + w*s*en$$

In the example of Equation (1), acceleration corresponds to acceleration perpendicular to gravity if acceleration is near constant, or a lead singular vector if acceleration is spread out in a dominant direction. In addition, a corresponds to a derivative of speed s, w corresponds to angular rotation rate about the vertical axis, es corresponds to the direction of travel, and en corresponds to a vector toward the center of rotation.

With motion-based constraints, an assumption may be made that the direction of travel is not in the vertical direction ev. Therefore:

$$en = ev \times es \quad \text{(Equation 2)}$$

Further, acceleration may be calculated as follows:

$$\text{acceleration} = a*es + w*s*(ev \times es) \quad \text{(Equation 3)}$$
$$= a*I*es + s*w*[ev\ x]*es$$
$$= (a*I + s*w*[ev\ x])*es$$

In the example of Equation (3), I corresponds to the 3×3 identity matrix and [ev x] corresponds to the skew-symmetric cross product matrix, such that the matrix product [ev x]*es is equal to the vector cross product cross(ev, es).

Moreover, the matrix (a*I+s*w*[ev x]) can be inverted to solve for direction of travel es as follows:

$$es = \text{inv}(a*I + s*w*[ev\ x])*\text{acceleration} \quad \text{(Equation 4)}$$

Thus, the device orientation initialization module 314 may set the direction of travel es based on Equation (4), in case where the predefined threshold for acceleration (e.g., associated with centrifugal motion) is met. If the predefined threshold for acceleration is not met, the device orientation initialization module 314 may set the direction of travel es based on a primary direction of acceleration (e.g., as provided by the accelerometer 308) for the electronic device 102. Further, the direction of travel may be used to estimate device orientation, which may be used as an initial set of parameters for the first position estimation model 318.

By virtue of setting the direction of travel in this manner, it is possible for the electronic device 102 to determine initial sets of parameters for device orientation (e.g., with reduced ambiguity with respect to heading and/or direction of travel). The device orientation may be used as initial value(s) for the Kalman filter 316 to estimate device position.

In one or more implementations, one or more of components of the GNSS receiver 302, the INS 304, the IMU 306, the accelerometer 308, the gyroscope 310, the position estimator 312, the device orientation initialization module 314, the Kalman filter 316, the first position estimation model 318, and/or the second position estimation model 320 are implemented as software instructions, stored in the memory 204, which when executed by the host processor 202, cause the host processor 202 to perform particular function(s).

In one or more implementations, one or more of components of the GNSS receiver 302, the INS 304, the IMU 306, the accelerometer 308, the gyroscope 310, the position estimator 312, the device orientation initialization module 314, the Kalman filter 316, the first position estimation model 318, and/or the second position estimation model 320 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
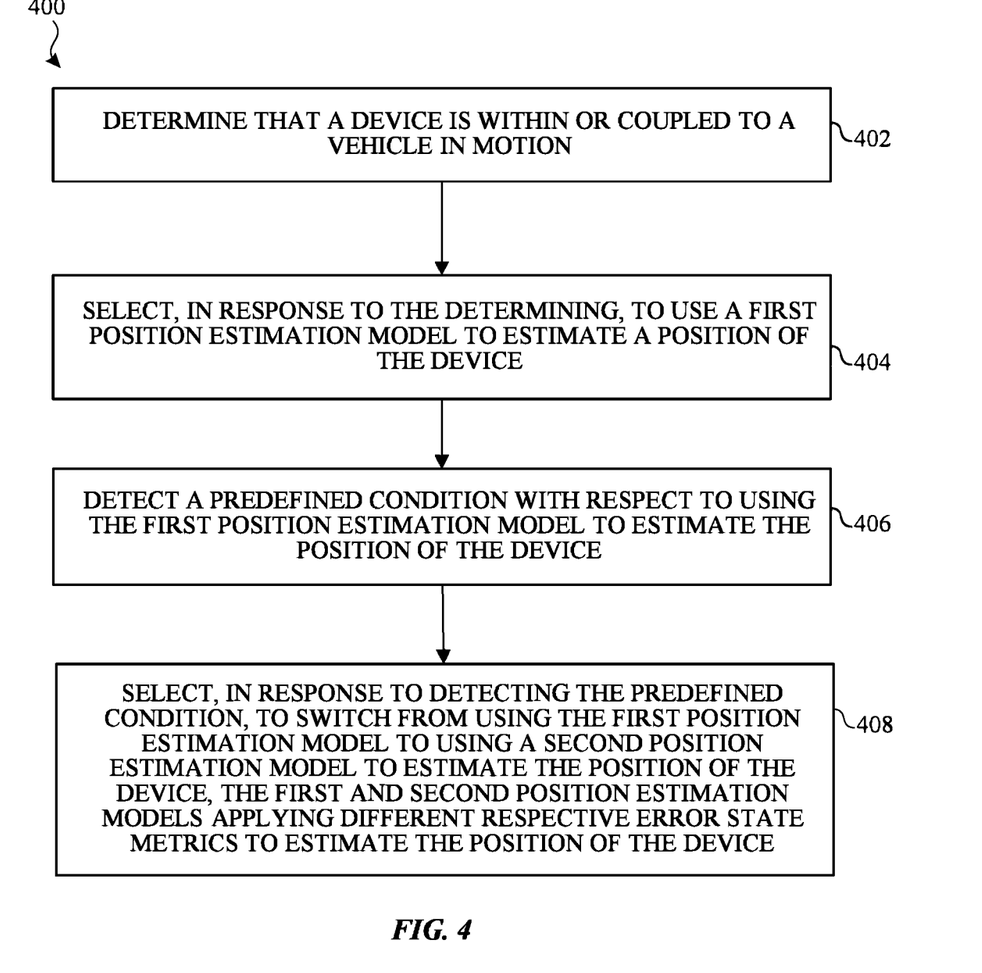
FIG. 4 illustrates a flow diagram of an example process for estimating the position of an electronic device in accordance with one or more implementations.

FIG. 4 illustrates a flow diagram of an example process for estimating the position of an electronic device in accordance with one or more implementations. For explanatory purposes, the process 400 is primarily described herein with reference to the electronic device 102 of FIG. 1. However, the process 400 is not limited to the electronic device 102 and one or more blocks (or operations) of the process 400 may be performed by one or more other components of the electronic device 102, and/or by other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, the electronic device 102 determines that it is positioned within or coupled to a vehicle in motion (e.g., the vehicle 104). The electronic device 102 selects, in response to the determining, to use a first position estimation model to estimate a position of the electronic device 102

(404). Using the first position estimation model may provide for initializing an orientation for the electronic device 102, the orientation including heading of the electronic device 102. In one or more implementations, using the first position estimation model may be based on an initial heading of the electronic device 102, the initial heading of the electronic device 102 having been determined based on a kinematics acceleration model which implements at least one motion-based constraint.

The electronic device 102 detects a predefined condition with respect to using a first position estimation model (e.g., the first position estimation model 318) to estimate the position of the electronic device 102 (406). Detecting the predefined condition may correspond with detecting that a predetermined amount of time has passed with respect to using the first position estimation model to estimate the position of the electronic device 102. Alternatively or in addition, detecting the predefined condition may correspond with detecting that GNSS measurements corresponding to device position converge with Kalman filter output corresponding to device position.

The electronic device 102 selects, in response to detecting the predefined condition, to switch from using the first position estimation model to using a second position estimation model (e.g., the second position estimation model 320) to estimate the position of the electronic device 102 (408). The first and second position estimation models may apply different respective error state metrics to estimate the position of the electronic device 102.

Each of the first and second position estimation models may be configured to estimate the position of the electronic device 102 based on Global Navigation Satellite System (GNSS) measurements. Each of the first and second position estimation models may be implemented within a Kalman filter (e.g., the Kalman filter 316). The Kalman filter may be configured to output the estimated position of the electronic device 102.

The different respective error state metrics may correspond to at least one of rate gyroscope bias, accelerometer scale factors or accelerometer bias. The first position estimation model may correspond with lower accuracy and higher acceleration relative to the second position estimation model. The first position estimation model may be configured to estimate the position of the electronic device 102 with respect to pedestrian motion. The second position estimation model may be configured to estimate the position of the electronic device 102 with respect to vehicle 104 motion.

The electronic device 102 may detect a second predefined condition with respect to using the second position estimation model to estimate the position of the electronic device 102. In response to detecting the second predefined condition, the electronic device 102 may select to switch from using the second position estimation model to using the first position estimation model to estimate the position of the electronic device 102. Detecting the second predefined condition may correspond with detecting that the electronic device 102 has been dismounted from a mount of the vehicle 104.

Figure 5:
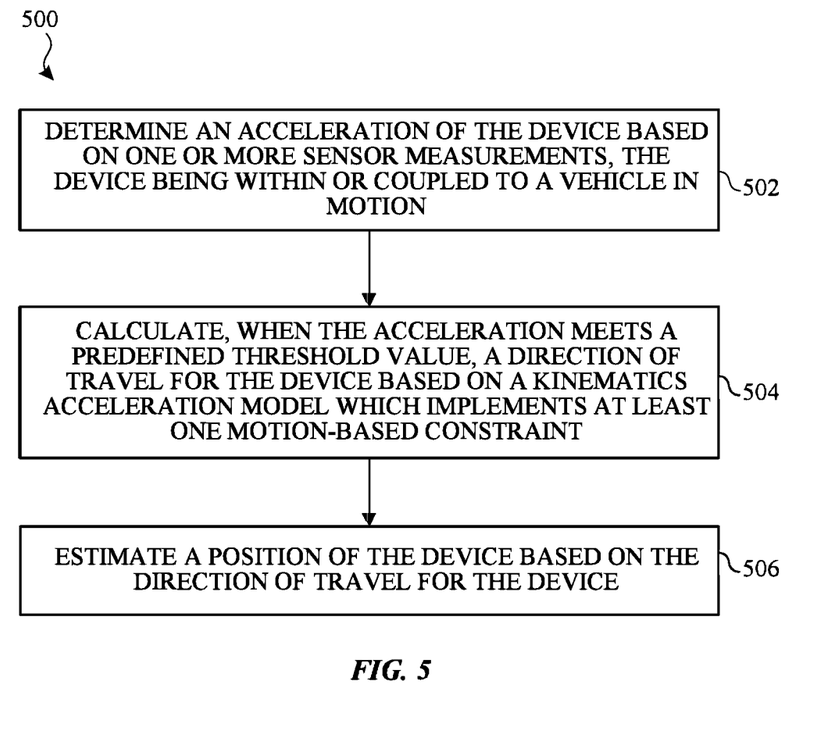
FIG. 5 illustrates a flow diagram of another example process for estimating the position of an electronic device in accordance with one or more implementations.

FIG. 5 illustrates a flow diagram of another example process for estimating the position of an electronic device in accordance with one or more implementations. For explanatory purposes, the process 500 is primarily described herein with reference to the electronic device 102 of FIG. 1. However, the process 500 is not limited to the electronic device 102 and one or more blocks (or operations) of the process 500 may be performed by one or more other components of the electronic device 102, and/or by other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

At block 502, the electronic device 102 determines its acceleration based on one or more sensor measurements, the electronic device 102 being within or coupled to a vehicle in motion (e.g., the vehicle 104). Determining the acceleration of the electronic device 102 may be based on capturing the one or more sensor measurements within a predefined time period (e.g., 3.5 seconds). The acceleration may be correspond to centrifugal motion of the electronic device 102.

The electronic device 102 calculates, when the acceleration meets a predefined condition (and/or threshold value(s)), a direction of travel for the electronic device 102 based on a kinematics acceleration model which implements at least one motion-based constraint (504). The at least one motion-based constraint may correspond to a non-holonomic constraint for vehicle motion. The electronic device 102 may calculate, when the acceleration does not meet the predefined threshold value, the direction of travel for the electronic device 102 based on a primary direction of acceleration for the electronic device 102.

The electronic device 102 estimates a position of the electronic device 102 based on the direction of travel for the electronic device 102 (506). Estimating the position of the electronic device 102 may be further based on Global Navigation Satellite System (GNSS) measurements. In addition, estimating the position of the electronic device 102 may be based on output from a Kalman filter (e.g., the Kalman filter 316). The Kalman filter may be configured to receive device orientation as input, the orientation being based on the direction of travel for the electronic device 102.

As described above, one aspect of the present technology is the gathering and use of data available from specific and legitimate sources for device orientation initialization. The present disclosure contemplates that in some instances, this gathered data may include personal information data that uniquely identifies or can be used to identify a specific person. Such personal information data can include demographic data, position-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for device orientation initialization. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of device orientation initialization, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting position data at city level rather than at an address level), controlling how data is stored (e.g., aggregating data across users), and/or other methods such as differential privacy. s Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
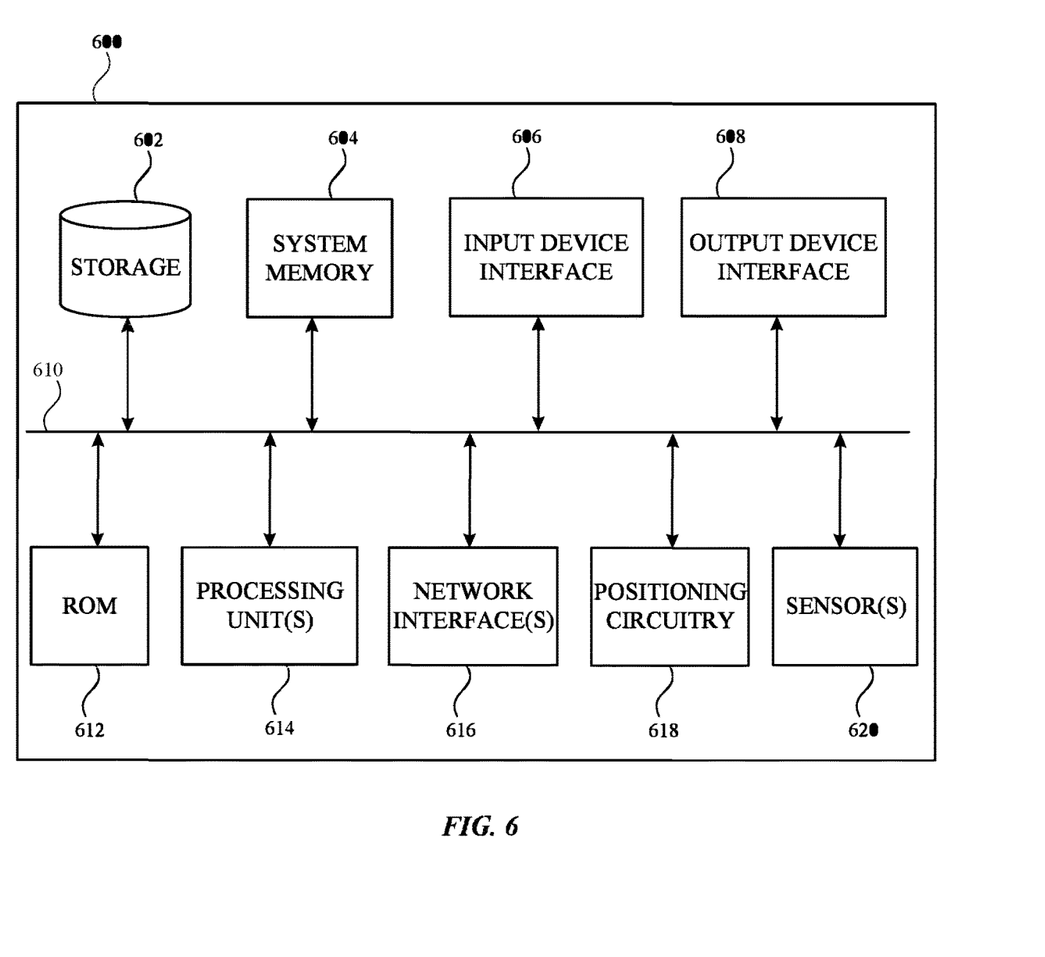
FIG. 6 illustrates an example electronic system with which aspects of the subject technology may be implemented in accordance with one or more implementations.

FIG. 6 illustrates an example electronic system with which aspects of the subject technology may be implemented in accordance with one or more implementations. The electronic system 600 can be, and/or can be a part of, any electronic device for generating the features and processes described in reference to FIGS. 1-5, including but not limited to a laptop computer, tablet computer, smartphone, and wearable device (e.g., smartwatch, fitness band). The electronic system 600 may include various types of computer readable media and interfaces for various other types of computer readable media. The electronic system 600 includes one or more processing unit(s) 614, a permanent storage device 602, a system memory 604 (and/or buffer), an input device interface 606, an output device interface 608, a bus 610, a ROM 612, one or more processing unit(s) 614, one or more network interface(s) 616, positioning circuitry 618, sensor(s) 620, and/or subsets and variations thereof.

The bus 610 collectively represents all system, peripheral, and chipset buses that communicatively connect the numerous internal devices of the electronic system 600. In one or more implementations, the bus 610 communicatively connects the one or more processing unit(s) 614 with the ROM 612, the system memory 604, and the permanent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 614 may need at runtime. In one or more implementations, the processes of the subject disclosure are stored in the system memory 604, the permanent storage device 602, and/or the ROM 612. From these various memory units, the one or more processing unit(s) 614 retrieves instructions to execute and data to process in order to execute the processes of one or more implementations.

The bus 610 also connects to the input and output device interfaces 606 and 608. The input device interface 606 enables a user to communicate information and select commands to the electronic system 600. Input devices that may be used with the input device interface 606 may include, for example, alphanumeric keyboards and pointing devices (also called "cursor control devices"). The output device interface 608 may enable, for example, the display of images generated by electronic system 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 610 also connects to positioning circuitry 618 and sensor(s) 620. The positioning circuitry 618 may be used in determining device position based on positioning technology. For example, the positioning circuitry 618 may provide for one or more of GNSS positioning, wireless access point positioning, cellular phone signal positioning, Bluetooth signal positioning, image recognition positioning, and/or an INS (e.g., via motion sensors such as an accelerometer and/or gyroscope).

In one or more implementations, the sensor(s) 620 may be utilized to detect movement, travel and orientation of the electronic system 600. For example, the sensor(s) may include an accelerometer, a rate gyroscope, and/or other motion-based sensor(s). Alternatively or in addition, the sensor(s) 620 may include one or more audio sensors(s) and/or image-based sensor(s) for determining device position and/or orientation. In another example, the sensor(s) 620 may include a barometer which may be utilized to detect atmospheric pressure (e.g., corresponding to device altitude).

Finally, as shown in FIG. 6, the bus 610 also couples the electronic system 600 to one or more networks and/or to one or more network nodes through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   determining, by a device, that the device is within or coupled to a vehicle in motion;
   selecting, by the device in response to the determining, to use a first position estimation model to estimate a position of the device;
   estimating, by the device, the position of the device using the first position estimation model;
   detecting, by the device, a predefined condition with respect to using the first position estimation model to estimate the position of the device;
   selecting, by the device in response to detecting the predefined condition, to switch from using the first position estimation model to using a second position estimation model to estimate the position of the device while the device is within or coupled to the vehicle in motion; and
   estimating, by the device, the position of the device using the second position estimation model,
   wherein the first and second position estimation models apply different respective error state metrics to estimate the position of the device.

2. The method of claim 1, wherein using the first position estimation model provides for initializing an orientation for the device, the orientation including a heading of the device.

3. The method of claim 1, wherein each of the first and second position estimation models is configured to estimate the position of the device based on Global Navigation Satellite System (GNSS) measurements.

4. The method of claim 1, wherein each of the first and second position estimation models is implemented within a Kalman filter, and
   wherein the Kalman filter is configured to output the estimated position of the device.

5. The method of claim 1, wherein the different respective error state metrics correspond to at least one of rate gyroscope bias, accelerometer scale factors or accelerometer bias.

6. The method of claim 1, wherein the first position estimation model provides lower accuracy relative to the second position estimation model.

7. The method of claim 1, wherein the first position estimation model is configured to estimate the position of the device with respect to pedestrian motion, and
   wherein the second position estimation model is configured to estimate the position of the device with respect to vehicle motion.

8. The method of claim 1, wherein detecting the predefined condition corresponds with detecting that a predetermined amount of time has passed with respect to using the first position estimation model to estimate the position of the device.

9. The method of claim 1, wherein detecting the predefined condition corresponds with detecting that Global Navigation Satellite System (GNSS) measurements corresponding to device position converge with Kalman filter output corresponding to device position.

10. The method of claim 1, further comprising:
    detecting a second predefined condition with respect to using the second position estimation model to estimate the position of the device; and
    selecting, in response to detecting the second predefined condition, to switch from using the second position estimation model to using the first position estimation model to estimate the position of the device.

11. The method of claim 10, wherein detecting the second predefined condition corresponds with detecting that the device has been dismounted from a mount of the vehicle or removed from the vehicle.

12. The method of claim 1, wherein using the first position estimation model is based on an initial heading of the device, the initial heading of the device having been determined based on a kinematics acceleration model which implements at least one motion-based constraint.

13. A computer program product comprising code stored in a non-transitory computer-readable storage medium, the code comprising:
  code to determine that a device is within or coupled to a vehicle in motion;
  code to select, in response to the determining, to use a first position estimation model to estimate a position of the device;
  code to estimate the position of the device using the first position estimation model;
  code to detect a predefined condition with respect to using the first position estimation model to estimate the position of the device;
  code to select, in response to detecting the predefined condition, to switch from using the first position estimation model to using a second position estimation model to estimate the position of the device while the device is within or coupled to the vehicle in motion; and
  code to estimate the position of the device using the second position estimation model,
  wherein the first and second position estimation models apply different respective error state metrics to estimate the position of the device.

14. A device, comprising:
at least one processor; and
a memory including instructions that, when executed by the at least one processor, cause the at least one processor to:
determine that a device is within or coupled to a vehicle in motion;
  estimate, in response to the determining, a position of the device using a first position estimation model;
  detect a predefined condition with respect to using the first position estimation model to estimate the position of the device; and
  switch, in response to the detection of the predefined condition, from using the first position estimation model to using a second position estimation model to estimate the position of the device while the device is within or coupled to the vehicle in motion,
  wherein the first and second position estimation models apply different respective error state metrics to estimate the position of the device.

15. The device of claim 14, wherein the at least one processor is configured to use the first position estimation model to initialize an orientation for the device, the orientation including a heading of the device.

16. The device of claim 14, wherein each of the first and second position estimation models is implemented within a Kalman filter, and
  wherein the Kalman filter is configured to output the estimated position of the device.

17. The device of claim 14, wherein the different respective error state metrics correspond to at least one of rate gyroscope bias, accelerometer scale factors or accelerometer bias.

18. The device of claim 14, wherein the first position estimation model provides lower accuracy relative to the second position estimation model.

19. The device of claim 14, wherein the first position estimation model is configured to estimate the position of the device with respect to pedestrian motion, and
  wherein the second position estimation model is configured to estimate the position of the device with respect to vehicle motion.

20. The device of claim 14, wherein the predefined condition comprises a predetermined amount of time passed with respect to using the first position estimation model to estimate the position of the device.

* * * * *